2,970,138

ION-EXCHANGE METHODS FOR THE PURIFICATION OF STREPTOMYCIN

Justin J. Murtaugh, Guilford, and Isidoro Caldas, Jr., Lawrenceburg, Ind., assignors to Schenley Industries, Inc., New York, N.Y.

No Drawing. Filed Dec. 28, 1955, Ser. No. 555,746

14 Claims. (Cl. 260—210)

This invention relates to new and improved processes for the purification of streptomycin. More particularly, the invention contemplates the provision of novel processes for the separation and recovery of streptomycin from relatively lower molecular weight impurities and inorganic cations associated therewith in fermentation broths and partially purified streptomycin products.

As practiced heretofore, streptomycin can be obtained from the elaboration product of *Streptomyces griseus* by adsorption on activated carbon followed by elution with acidic solvent, such as acidified water or methanol. Streptomycin can also be recovered from its culture media and other solutions by adsorption on cation exchange resins of the weak carboxylic acid type. The streptomycin obtained in this manner can be recovered from the cation exchange resin as a solution of its acid salt by elution of the streptomycin from the resin with acid. These solutions of streptomycin can be treated for recovery of the antibiotic in the form of solid salts by precipitation with suitable solvents or by other conventional procedures. In the foregoing processes, the streptomycin is obtained in the form of a relatively crude product such, for example, as streptomycin trihydrochloride of relatively low activity or potency. The potency of streptomycin is usually established by biological methods and measured in terms of its capacity to inhibit growth of sensitive microorganisms such as *Escherichia coli* and *Bacillus subtilis* in comparison with a standard of known activity (J. Biol. Chem. 153, 249 (1944); J. Bact. 47, 199 (1944)). The potency or activity may also be determined chemically by measuring the amount of maltol formed from the biologically active portion of the streptomycin molecule upon alkaline hydrolysis of the antibiotic, or by testing for the guanido grouping in the streptidine moiety of the molecule.

The crude streptomycin salt as obtained by the foregoing methods can be further purified by adsorption chromatography from methanol or aqueous methanol on an acid-washed alumina column (J. Biol. Chem., 160, 337 (1945)), or by preparation and recrystallization of the reineckate, reineckate sulfate, or helianthate. Streptomycin as obtained by the subsequent conversion of the latter compounds to the desired mineral acid salt is substantially pure streptomycin. Pure streptomycin has also been obtained heretofore by crystallization of the streptomycin trihydrochloride-calcium chloride double salt or so-called streptomycin calcium chloride complex (J. Am. Chem. Soc. 67, 1866 (1945)).

While streptomycin can be separated from fermentation broth and subsequently purified by various combinations of the techniques described above, these methods suffer from certain inherent disadvantages. Thus, for example, when attempting recovery by adsorption on activated carbon, it is difficult or impossible to elute all of the streptomycin so adsorbed. Likewise, in conventional precipitation methods for recovery of the antibiotic, some streptomycin is lost in the mother liquors which are either too dilute or contain too many impurities to permit salvage of the antibiotic on any economical basis. In most streptomycin recovery processes proposed heretofore, substantial losses of the antibiotic occur by reason of the excessive number of physical operations required under constant variations in concentration of the antibiotic and other impurities associated therewith. From a commercial standpoint, a great number of variations in a recovery process adds considerably to the handling and equipment costs for the process, and such a process is therefore substantially more expensive than one which can be conducted on a substantially uniform basis.

The crude streptomycin salts obtained from fermentation broth by adsorption and subsequent elution and precipitation from either a carbon adsorption process or a cation exchange process as described hereinbefore, contain impurities which can be chemically identified or classified according to their molecular size or physiological properties. One group of such impurities consists of inorganic cations of the elements sodium, potassium, calcium and magnesium. Methods for the determination of these metals are given in many standard text books and therefore need not be described here. Another group of such impurities is that consisting of histamine or histamine-like substances. These impurities are highly toxic, functioning to depress blood pressure, and must therefore be removed as completely as possible from the antibiotic during recovery and/or purification thereof. The standard test for estimation of histamine and histamine-like substances, as prescribed by the Food and Drug Administration Regulations pertaining to antibiotics and antibiotic-containing drugs, is to narcotize a cat with sodium pentobarbital and to inject the streptomycin or a complex thereof, into the femoral vein of the cat at a level of 3.0 mg. or 3000 units of streptomycin per kilogram of body weight of the animal. A streptomycin preparation is considered suitable for injection into humans provided its content of histamine-like substances has been so reduced that the injection at the aforementioned level produces a lowering of blood pressure in the test animal which is equal to or less than the lowering of blood pressure produced by 0.1 microgram of histamine base per kilogram of body weight of the animal.

The general object of the present invention is to provide a simple and expeditious method for separating streptomycin from inorganic cations and closely related cationic impurities of lower molecular weight than streptomycin by the application of selective ion exchange phenomena. A specific object of the invention is to provide a method of separating streptomycin from histamine and histamine-like substances by such a selective ion exchange technique. The invention further contemplates the provision of a selective ion exchange process of the general type described which eliminates the necessity for variable-type operations as practiced heretofore in the recovery of streptomycin and its separation from closely related cationic impurities. Other features and objects of the invention will appear from the following detailed description of specific embodiments thereof.

The invention is based, in part, on our discovery that streptomycin can be separated from other mold elaborated products associated therewith in fermentation broth, or from impurities introduced during subsequent recovery procedures, by contacting a streptomycin solution containing said products or impurities with a high-density, nuclear sulfonic-acid type cation-exchange resin for a controlled period of time. This is accomplished, for example, by adding an ion exchange resin of the type described to a solution of streptomycin containing impurities in the form of metal ions or histamine or histamine-like substances, and permitting contact of the resin and solution for a period of time sufficient to provide for the selective adsorption of the impurities, and then separating the resin and streptomycin solution before any substantial quantity of streptomycin is adsorbed from solution. As will be readily apparent, the process can be effected most advantageously by passing the impure solution of streptomycin through a column of the desired resin at a rate of flow adequate to permit substantially complete adsorption of impurities but insufficient to permit adsorption of any appreciable quantities of streptomycin. Thereafter, the resulting solution of streptomycin, free from cationic metals and histamine and/or histamine-like substances, may be passed through a resin column containing a weak-base type (acid adsorbing) anion-exchange resin to remove the free acid formed by exchange in the initial resin column. Alternatively, the purified solution recovered from the initial exchange column may be precipitated from a suitable solvent to obtain a purified streptomycin salt. We have found that the cation-exchange resin in the hydrogen form may be used separately or in intimate admixture with the weak anion-exchange resin in a monobed-type column. We have further found that the triethylamine salt of the cation-exchange resin may be employed effectively in a process of the invention.

While each of the foregoing procedures may be employed with efficient results in the process of the invention, we prefer to employ a procedure whereby an aqueous streptomycin solution prepared by adsorbing streptomycin from fermentation broth onto a carboxylic acid type (weak acid) cation-exchange resin and eluting with a strong mineral acid in conventional manner, is passed through a column containing a high-density nuclear sulfonic acid type cation-exchange resin in the acid form admixed with a weak-base type (acid adsorbing) anion-exchange resin. The effluent recovered from a monobed column of this type contains streptomycin free from metal cations of the group sodium, potassium, calcium and magnesium, free of histamine and histamine-like impurities, and also free of any excess mineral acid. The purified streptomycin solution thus obtained is suitable for injection without application of any additional purification procedures other than the usual sterility precautions.

On the basis of our preliminary investigations, it was found that certain synthetic nuclear sulfonic-acid type cation-exchange resins, i.e., resins which derive their ion exchange activity as a result of sulfonic acid groups, such, for example, as the resin manufactured and sold by Rohm and Haas Company of Philadelphia, Pennsylvania, under the registered trade name "Amberlite IR-120" (a sulfonated copolymer of styrene and divinylbenzene), exhibit unusual adsorption selectivity with respect to small organic cations of histamine and histamine-like impurities present in streptomycin solutions. While such resins, in their sodium cycle, are capable of effecting complete removal of histamine from streptomycin solutions without any appreciable adsorption of streptomycin, we further found that they also bring about an increase in the inorganic salts content of the streptomycin solutions during the purification process.

In line with the foregoing observations, we converted the specific resin "Amberlite IR-120" to its hydrogen form using an excess of ten percent (10%) by weight sulfuric acid solution, followed by conversion to the triethylamine form with an excess of triethylamine in water, and found that by employing the resin in this modified form it was possible to effect substantially complete removal of histamine and histamine-like impurities while also reducing the inorganic salts content of the streptomycin solutions. The results of these experiments are indicated in the following table wherein resin "A" consisted of "Amberlite IR-120" in the sodium form, and resin "B" consisted of "Amberlite IR-120" converted to the triethylamine form in the manner described hereinbefore. In each instance, the resin column used was 10.16 centimeters (inside diameter) by 66.24 centimeters in height, and the feed solution contained 80,000 micrograms of streptomycin per milliliter and exhibited an excessive histamine drop (standard test-supra) before treatment. The recovery of streptomycin with all three resins was better than ninety-five percent (95%) of the amount fed to the column.

TABLE

| Resinous Exchanger | Inorganic Salts Content, mg./ml. | | Histamine, mm. Hg | |
|---|---|---|---|---|
| | Before | After | Before | After |
| A | 1.2 | 14.7 | 20 | 1 |
| B | 2.2 | 0.16 | 47 | 0 |

While resin form "B" above proved highly efficacious for the removal of histamine and/or histamine-like substances, its use necessitates an additional process step to eliminate triethylamine salts from the effluent, which, for example, in the case of streptomycin sulfate, may be effected by precipitating streptomycin from the effluent with excess methyl alcohol; the triethylamine salts being discarded in the spent filtrate. Accordingly, in order to avoid the necessity of this precipitation procedure, we investigated use of the resin "Amberlite IR-120" in its hydrogen form and found that its capacity in this form was substantially identical to the capacity demonstrated in the foregoing table for the triethylamine "B" form of the resin. On the other hand, the rich effluents obtained through use of the resin in this form demonstrated the presence of free acid with pH values within the range of 1.0 to 1.5, and in order to avoid the introduction of additional salts under these conditions, neutralization of the effluent was effected using weakly basic amine anion-exchange resins, such for example, as the resin sold under the registered trade-name "Amberlite IR-4B" and also manufactured by Rohm and Haas Company of Philadelphia. This procedure consisted of regenerating the cationic exchanger with sulfuric acid, and, after washing off the excess acid with demineralized water, mixing the resin with an equal volume of the anionic exchanger, in its free base form. Two columns were employed in this procedure, each 20.32 centimeters (inside diameter) by 304.8 centimeters in height, and each was filled with fifty (50) pounds of the admixed resins in the form of a dense aqueous slurry. After draining excess water to the level of the resin in the columns, a streptomycin solution was passed through the resin bed at a rate of 750 milliliters per minute. Under these conditions, it was found that an average of 225 liters of streptomycin solution could be treated within the two columns with entirely satisfactory removal of impurities.

On the basis of the foregoing investigations, a unit was finally evoved which was found to be completely operative for the purpose intended. In this preferred process of our invention, we admix a sulfonic acid type cation-exchange resin of the type of "Amberlite IR-120" in its hydrogen form, and a weakly basic anion-exchange resin such as that sold under the registered trade-name "Amberlite IR-45" (Rohm and Haas Company, Philadephia) in the free base form, and employ the admixed resins in a mixed or monobed type of apparatus. Thus, equal weights of the cation-exchange resin "Amberlite IR-120" (in the hydrogen form) and "Amberlite IR-45" (in the free base form) are placed in a clear glass column or other suitable retention vessel and covered with approximately twenty (20) to thirty (30) centimeters of demineralized water. Compressed air is admitted through the bottom of the column at a rate of 15.2 cubic centimeters per second per square centimeter of column cross-section and approximately fifteen (15) to twenty (20) minutes are allowed for complete admixing of the separate resins. Thereafter, the air flow is stopped and the admixed resins are permitted to settle while the water is slowly drained to the level of the resins in the column. For optimum results, the resinous bed should be not less than approximately sixty-one (61) centimeters high in order to avoid end effects in the lower part of the column, and the contact time of the streptomycin solutions with the resinous exchangers for minimum adsorption of streptomycin should be maintained low by suitably adjusting the flow rate. In actual practice, we have found that a contact time of less than ten (10) minutes will maintain the loss of streptomycin activity by adsorption to a value well below five percent (5%) of the activity initially present in the solutions treated, while effecting substantially complete elimination of impurities.

A streptomycin solution containing approximately 80,000 units of streptomycin per milliliter which exhibited a histamine drop in excess of 26 mm. Hg prior to treatment was passed downwardly through the column and collected from an outlet provided at the bottom of the exchange vessel. The solution was found to contain better than ninety-seven percent (97%) of its original streptomycin activity and the removal of histamine and histamine-like impurities as well as inorganic salts was virtually complete.

The mixed resins were first washed downwardly with approximately 3.785 liters of a four percent (4%) by weight solution of aqueous potassium hydroxide per pound of combined resins at a rate of 0.24–0.28 liter per hour per square centimeter of bed. Thereafter, the resins were washed with water to displace excess regenerant. The resins were then separated by backwashing with water at a rate of 0.61–0.65 liter per hour per square centimeter of bed for a period of ten (10) to fifteen (15) minutes, at which time a sparger plate was placed into position at the approximate level of the interface of the two settled resins and the flow of water was gradually reduced until the resins had settled in place. The regenerated anion resin, being lighter, settles at the upper section of the column above the sparger plate and may be recovered therefrom or left intact for reuse following regeneration of the cation exchanger.

While water is passed downwardly through the resins, a ten percent (10%) by weight aqueous solution of sulfuric acid is fed to the sparger and drained simultaneously with the water from the bottom outlet. The water and acid rates are maintained about equal at 0.61 liter per hour per square centimeter. The amount of acid solution of ten percent (10%) concentration required, averages about one-half a liter per pound of cation-exchanger being regenerated. After washing downwardly to remove residual acid regenerant remaining in the column, the resins are again admixed by suspending with air and are ready for reuse.

As will be readily apparent to those skilled in the science of the present invention, the selective adsorption of metal ions of the class described and histamine and histamine-like substances which are cations, from streptomycin, which is also a cation, is a totally unexpected phenomenon. The selective nature of the resins for adsorption of such impurities from streptomycin is apparently attributable to the specific properties of the high-density nuclear sulfonic acid type exchange resins described hereinbefore. Thus, upon investigation in general of the sulfonic acid type cation-exchange resins of the class produced by sulfonating copolymers of styrene and divinylbenzene, we found that when streptomycin solutions were contacted with different resins containing two percent (2%), four percent (4%), six percent (6%) and eight percent (8%) by weight of divinylbenzene, the rate of adsorption of streptomycin on the resins varied in accordance with the degree of cross-linkage of the resins or the divinylbenzene content thereof. Resins containing two percent (2%) divinylbenzene adsorbed streptomycin very rapidly and would become saturated at substantially all of their exchange sites in less than ten (10) minutes. The resins containing greater proportions of divinylbenzene adsorbed streptomycin more slowly. The rate of adsorption of streptomycin decreased as the divinylbenzene content increased until at eight percent (8%) cross-linkage or divinylbenzene content, less than ten percent (10%) of the possible exchange sites of the resin were saturated with streptomycin. Additional experiments demonstrated that the high-density sulfonic acid resins become saturated with streptomycin only after long periods of contact, i.e., sixteen to twenty-four (16–24) hours but will saturate with smaller organic molecules such as histamine or inorganic metal ions in a matter of minutes. From the above described experiments, it will be readily appreciated that only such high-density exchange resins can be used in practicing the processes of the invention. The term "high-density" can be defined as designating the "degree of cross-linkage", which in the present case can be further defined as the percentage divinylbenzene present in the resin. To those skilled in the science of the invention, the terms described above are well known and in common use. We have found that sulfonic acid cation-exchange resins of the general class described, containing as low as six percent (6%) divinylbenzene content, can be used in the processes of our invention, but we prefer to employ those of eight percent (8%) divinylbenzene content or higher.

The processes of the invention may be best understood by reference to the following specific examples showing typical recoveries of streptomycin by application of the foregoing principles and techniques:

*Example I*

An aqueous streptomycin sulfate solution, in amount of 300 milliliters, and containing 57.6 grams of streptomycin base of purity 576 micrograms per milligram, and also containing 10 milligrams per milliliter of sulfate ash of the metals sodium, potassium calcium and magnesium, and an amount of histamine or histamine-like substances sufficient to produce a drop in blood pressure equivalent to five (5) times the maximum permissive standard, was passed downwardly through a glass column (1.58 centimeters inside diameter x 91.44 centimeters in height) containing 120 grams of the cation-exchange resin "Amberlite IR–120" in the acid form. The flow rate was 10 milliliters per minute and the contact time between resin and solution was seven (7) minutes. The streptomycin solution was followed by 200 milliliters of water and 400 milliliters of effluent of pH 1.1 was collected. The effluent was passed through a second glass column of the same size containing the weak anion-exchange resin "Amberlite IR–4B." The resulting solution of streptomycin at pH 6.8 was found to be free of histamine and histamine-like substances and free of inorganic metal ions. The purity of the solution was 715 micrograms per milligram. The overall recovery of streptomycin represented 94.4% of the activity present in the original impure solution.

*Example III*

A streptomycin solution identical to that described in Example I, in amount of 300 milliliters, was passed downwardly through a glass column (1.58 centimeters inside diameter x 76.2 centimeters in height) containing a mixture of 60 grams of the cation-exchange resin "Amberlite IR–120" in the acid form and 60 grams of the anion-exchange resin "Amberlite IR–45" in the free base form. The flow rate was 8 milliliters per minute and the contact time between the resin and streptomycin solution was seven (7) minutes. The streptomycin solution was followed by 200 milliliters of water and 400 milliliters of effluent was collected at a pH of 6.0. The recovered streptomycin solution was analyzed and found to be free of histamine and histamine-like substances, free of inorganic metal ions, and had a potency of 728 micrograms per milligram. The recovery of streptomycin sulfate was 94.9%.

Example III

Exchanger:
- Column: 10.16 centimeters (inside diameter).
- Resin: "Amberlite IR-120" as the triethylamine salt.
- Bed depth: 114.3 centimeters.
- Bed volume: 9289 cubic centimeters.
- Weight of resin: 15.8 pounds.

Streptomycin sulfate solution:
- Volume: 96.0 liters.
- Concentration: 209,000 micrograms/milliliter.
- Ash content: 3.4 milligrams/milliliter.
- Histamine or histamine-like substances: 20 mm. Hg (standard=−17 mm. Hg).
- Total amount of streptomycin: 20 kilograms.
- Purity: 720 micrograms/milligram.
- Flow rate: 115 liters per hour.

ANALYSIS OF FRACTIONS COLLECTED

| No. | Vol. (liters) | Activity (mcg./ml.) | Histamine (mm. in blood pressure) | Ash Content | Final Purity After Precipitation from Methanol to Separate Triethylamine Sulfate |
|---|---|---|---|---|---|
| 1 | 10 | 177,000 | 0 | 0 | 751 |
| 2 | 10 | 189,000 | 0 | 0 | 738 |
| 3 | 10 | 202,000 | 0 | 0 | 737 |
| 4 | 10 | 202,000 | 0 | 0 | 746 |
| 5 | 10 | 207,000 | 0 | 0 | 750 |
| 6 | 10 | 207,000 | 0 | 0 | 749 |
| 7 | 10 | 202,000 | 0 | 0 | 744 |
| 8 | 10 | 202,000 | 0 | 0 | 745 |
| 9 | 10 | 202,000 | 0 | 0 | 766 |
| 10 | 10 | 135,000 | 0 | 0 | 748 |

NOTE.—19.25 kg.=96.3% recovery.

Since it is considered obvious that some changes and modifications can be made in the foregoing methods and procedures without departing from the nature and spirit of our invention, it is to be understood that the invention is not to be limited to the specific details offered by way of illustration above, except as set forth in the following claims.

We claim:

1. Process for the purification of streptomycin that comprises contacting a relatively impure solution of streptomycin with a high-density sulfonic-acid type cation-exchange resin for a controlled period of time, whereby organic and inorganic impurities present in solution including histamine and histamine-like cation impurities are selectively adsorbed by said exchange resin to the substantial exclusion of streptomycin, and separating and recovering a relatively pure solution of streptomycin from the exchange resin.

2. Process as claimed in claim 1 wherein said cation-exchange resin is employed in the form of its triethylamine salt.

3. Process as claimed in claim 1 wherein said cation-exchange resin is employed in the free acid form.

4. Process as claimed in claim 1 wherein said cation-exchange resin is employed in intimate admixture with a relatively weak anion-exchange resin.

5. Process for the purification of streptomycin that comprises contacting for a controlled period of time a relatively impure solution of streptomycin with a mixed bed of ion-exchange resins comprised of an intimate admixture of a high-density sulfonic-acid type cation-exchange resin and a relatively weak anion-exchange resin, whereby organic and inorganic impurities present in the streptomycin solution are adsorbed by said resins, and separating and recovering a relatively pure solution of streptomycin from the mixed bed.

6. Process for the purification of streptomycin that comprises contacting a relatively impure solution of streptomycin for a controlled period of time with an intimately admixed bed of ion-exchange resins comprised of a high-density sulfonic-acid type cation-exchange resin in the hydrogen form and a relatively weak anion-exchange resin in the free base form, whereby inorganic and organic impurities present in solution with streptomycin are selectively adsorbed by said exchange resins, and separating and recovering a relatively pure solution of streptomycin from said exchange bed.

7. Process for the purification of streptomycin that comprises contacting a relatively impure solution of streptomycin for a controlled period of time with a mixed bed of ion-exchange resins comprised of an aqueous, intimately admixed slurry of a high-density cation-exchange resin deriving its exchange capacity from sulfonic acid groups and a relatively weak anion-exchange resin, whereby organic and inorganic impurities present in solution with streptomycin are selectively adsorbed by said exchange resins, and separating and recovering a relatively pure solution of streptomycin directly from said exchange bed.

8. Process for the purification of streptomycin that comprises passing a relatively impure solution of streptomycin obtained by elution of the streptomycin from an adsorption medium with a strong mineral acid, into controlled contact with an intimately admixed bed of ion-exchange resins comprised of a high-density sulfonic-acid type of cation-exchange resin and a relatively weak anion-exchange resin, whereby inorganic cations of the group consisting of sodium, potassium, calcium and magnesium, histamine and histamine-like impurities, and excess mineral acid present in solution with streptomycin are adsorbed by said exchange resins, and separating and recovering a relatively pure solution of streptomycin directly from said exchange bed.

9. Process for the purification of streptomycin that comprises passing a relatively impure solution of streptomycin obtained by elution of the streptomycin from an adsorption medium with a strong mineral acid, into controlled contact with an intimately admixed bed of ion-exchange resins comprised of a cation-exchange resin consisting of a sulfonated copolymer of styrene and divinylbenzene containing at least six percent (6%) divinylbenzene, and a relatively weak anion-exchange resin, whereby inorganic cations of the group consisting of sodium, potassium, calcium and magnesium, histamine and histamine-like impurities, and excess mineral acid present in solution with streptomycin are adsorbed by said exchange resins, and separating and recovering a relatively pure solution of streptomycin directly from said exchange bed.

10. Process for the purification of streptomycin that comprises passing a relatively impure solution of streptomycin obtained by elution of the streptomycin from an adsorption medium with a strong mineral acid, into controlled contact with an intimately admixed bed of ion-exchange resins comprised of a cation-exchange resin consisting of a sulfonated copolymer of styrene and divinylbenzene containing at least eight percent (8%) divinylbenzene, and a relatively weak anion-exchange resin, whereby inorganic cations of the group consisting of sodium, potassium, calcium and magnesium, histamine and histamine-like impurities, and excess mineral acid present in solution with streptomycin are adsorbed by said exchange resins, and separating and recovering a relatively pure solution of streptomycin directly from said exchange bed.

11. Process for the purification of streptomycin that comprises contacting for a controlled period of time a relatively impure solution of streptomycin containing excess mineral acid and impurities in the form of histamine and histamine-like substances and metal cations of the group consisting of sodium, potassium, calcium and magnesium, with a mixed-bed of ion-exchange resins consisting of an intimately admixed aqueous slurry of a high-density nuclear sulfonic-acid type cation-exchange resin and a relatively weakly basic anion-exchange resin, whereby said excess mineral acid, histamine and histamine-like substances and metal cations are adsorbed to the substantial exclusion of streptomycin by the exchange resins, and separating and recovering a relatively pure solution of streptomycin directly through drainage from the exchange bed.

12. In a process for the removal of excess mineral acid, metal cations of the group consisting of sodium, potassium, calcium and magnesium, and histamine and histamine-like impurities from relatively impure streptomycin solutions, the improvement that comprises selectively adsorbing said impurities onto a mixed bed of ion-exchange resins comprised of a high-density nuclear sulfonic-acid type cation-exchange resin and a relatively weakly basic anion-exchange resin, to the substantial exclusion of adsorption of streptomycin contained within said solution.

13. Process for the purification of streptomycin that comprises passing a relatively impure solution of streptomycin containing impurities in the form of histamine and histamine-like substances and metal cations of the group consisting of sodium, potassium, calcium and magnesium, into controlled contact with a high-density nuclear sulfonic-acid type cation-exchange resin whereby said histamine and histamine-like substances and metal cations are selectively adsorbed from solution to the substantial exclusion of adsorption of streptomycin contained within said solution, thereafter passing the streptomycin solution into contact with a relatively weakly basic, acid adsorbing anion-exchange resin to remove excess acid from the solution, and separating and recovering a relatively pure solution of streptomycin from said anion-exchange resin.

14. In a process for the removal of excess mineral acid, histamine and histamine-like impurities, and metal cations of the group consisting of sodium, potassium, calcium and magnesium from relatively impure streptomycin solutions, the improvement that comprises selectively adsorbing the histamine and histamine-like impurities and metal cations onto a high-density nuclear sulfonic-acid type cation-exchange resin, and thereafter passing the streptomycin solution into contact with a relatively weakly basic anion-exchange resin to remove excess acid from the solution, and separating and recovering a relatively pure streptomycin solution from the anion-exchange resin.

References Cited in the file of this patent

UNITED STATES PATENTS

| | | |
|---|---|---|
| 2,528,022 | Van Dolah et al. | Oct. 31, 1950 |
| 2,528,188 | Taylor | Oct. 31, 1950 |
| 2,765,302 | Bartels et al. | Oct 2, 1956 |
| 2,827,417 | Friedman | Mar. 18, 1958 |